United States Patent [19]
Christman et al.

[11] Patent Number: 5,286,758
[45] Date of Patent: Feb. 15, 1994

[54] USE OF FORMATE SALTS AS AUXILIARY AGENTS FOR LOW DENSITY RIGID FOAMS

[75] Inventors: Donald L. Christman, Grosse Ile; Curtis J. Reichel, Southgate, both of Mich.

[73] Assignee: BASF Corporation, Parsippany, N.J.

[21] Appl. No.: 355

[22] Filed: Jan. 4, 1993

[51] Int. Cl.$^5$ ................................................. C08J 9/12
[52] U.S. Cl. ................................. 521/125; 521/128
[58] Field of Search ................................. 521/125, 128

[56] References Cited

U.S. PATENT DOCUMENTS 4,345,042  8/1982  Kuroda et al. ........................ 521/125
4,868,043  9/1989  Eling et al. ........................... 521/125
5,137,929  8/1992  Demmin et al. ...................... 521/128

*Primary Examiner*—Morton Foelak
*Attorney, Agent, or Firm*—Martin P. Connaughton

[57] ABSTRACT

It has been found that in addition to acting as an auxiliary blowing agent, various salts of formic acid may be used to tailor the reactivity characteristics of rigid, polyurethane foam formulation. Salts of particular interest are: ammonium formate, sodium formate, and potassium formate. By varying amounts and combinations of the above salts, characteristics of a formulation's reactivity such as cream time, gel time, rise time, and tack-free time may be manipulated.

7 Claims, No Drawings

USE OF FORMATE SALTS AS AUXILIARY AGENTS FOR LOW DENSITY RIGID FOAMS

SUMMARY OF THE INVENTION

Polyurethane foams can be prepared with blowing agents developed "in situ" by the reaction of water or formic acid with isocyanates. Surprisingly, the addition of many formate salts improves the blowing efficiency, i.e., additional blowing (lowering of foam density) occurs, than if only water or formic acid are used. Combinations of the salts are also used to change the reactivity profile or characteristics of a formulation. Foams of the present invention may be useful in high pressure reaction injection systems and spray-in-place applications.

BACKGROUND OF THE INVENTION

The use of carboxylic acids and their salts is known in the art. U.S. Pat. No. 3,058,924 describes the use of formic acid as a blowing agent in polyurethane foams based upon adducts of hexahalocyclopentadiene and unsaturated monocarboxylic compounds. U.S. Pat. No. 4,417,002 describes a carboxylic acid or carboxylate reacted with an isocyanate to produce gas which is used as an effective blowing agent for polyurethanes. This invention describes such use in the manufacture of various types of urethane foams. The salts of formic acid found to be useful were those of formic acid with weak organic bases such as hydrazine, triethylamine, dimethylbenzylamine, and triethylenediamine. It is also disclosed that carboxylic acids and their salts are less exothermic than water in their reaction with isocyanates. U.S. Pat. No. 5,025,039 is directed to a process for the production of molded polyurethane foams having a compact surface and a density of at least 250 kg/m$^3$ (15.6 pcf).

It has been found in the present invention that formic acid and its salts may be used not only as blowing agents but can also be used to tailor the reactivity profile of a given polyurethane foam system.

OBJECT OF THE INVENTION

The present invention is directed to a process for the production of low density, rigid polyurethane foams formed by reacting,
a) a polyisocyanate component with,
b) an isocyanate reactive component containing at least one organic compound having at least two isocyanate reactive groups,
c) water and/or formic acid as a blowing agent, and
d) an auxiliary agent selected from the group consisting of ammonium formate, sodium formate, potassium formate, and mixtures thereof,
in the presence of catalysts, surfactants, chain extenders, crosslinkers, fillers, pigments, stabilizers, or antioxidants.

DETAILED DESCRIPTION OF THE INVENTION

Many isocyanates are useful in the preparation of urethanes. Examples of such isocyanates may be found in columns 8 and 9 of U.S. Pat. No. 4,690,956, herein incorporated by reference. The isocyanates preferred are the commercial methylenediphenylenediisocyanates (MDI) and crude or polymeric MDI. Other isocyanates which may be useful include isophoronediisocyanate and tetramethybcylidenediisocyanate. Other isocyanates may be found in the Polyurethane Handbook, Chapter 3, §3.2 pages 62–73 and Polyurethanes: Chemistry and Technology, Chapter II, §II, pages 17–31.

Modified isocyanates are also useful. Such isocyanates are generally prepared through the reaction of a commercial isocyanate, for example, TDI or MDI, with a low molecular weigh diol or amine, or alkanolamine, or by the reaction of the isocyanates with themselves. In the former case, isocyanates containing urethane, bioret, or urea linkages are prepared; while in the latter case, isocyanates containing allophanate, carbodiimide, or isocyanurate linkages are formed.

The isocyanate reactive component is generally an organic compound having at least two hydroxyl groups.

Hydroxyl group-containing compounds (polyols) useful in the preparation of polyurethanes are described in the Polyurethane Handbook in Chapter 3, §3.1, pages 42–61; and in Polyurethanes: Chemistry and Technology in Chapter II, §III and IV, pages 32–47. Many hydroxyl group-containing compounds may be used, including simple aliphatic glycols, dihydroxyl aromatics, bisphenols, and hydroxyl-terminated polyethers, polyesters, and polyacetals, among others. Extensive lists of suitable polyols may be found in the above references and in many patents, for example, in columns 2 and 3 of U.S. Pat. No. 3,652,639; columns 2–6 of U.S. Pat. No. 4,421,872; and columns 4–6 of U.S. Pat. No. 4,310,632; these three patents being hereby incorporated by reference.

Preferably used are hydroxyl-terminated polyoxyalkylene polyols. They are generally prepared by well-known methods, for example, by the base catalyzed addition of an alkylene oxide, preferably ethylene oxide (oxirane), propylene oxide (methyloxirane) or butylene oxide (ethyloxirane) to an initiator molecule containing on the average two or more active hydrogens. Examples of preferred initiator molecules are dihydric initiators such as ethylene glycol, propylene glycol, butylene glycol, neopentyl glycol, 1,6-hexanediol, hydroquinone, resorcinol, the bisphenols, aniline and other aromatic monoamines, aliphatic monoamities, and monoesters of glycerine; trihydric initiators such as glycerine, trimethylolpropane, trimethylolethane, N-alkyl-phenylenediamines, mono-, di-, and trialkanolamines; tetrahydric initiators such as ethylenediamine, propylenediamine, 2,4'-, 2,2'-, and 4,4'-methylenedianiline, toluenediamine, and pentaerythritol; pentahydric initiators such as diethylenetriamine; and hexahydric and octahydric initiators such as sorbitol and sucrose.

Addition of alkylene oxide to the initiator molecules may take place simultaneously or sequentially when more than one alkylene oxide is used, resulting in block, heteric, and block-heteric polyoxyalkylene polyethers. The number of hydroxyl groups will generally equal the number of active hydrogens in the initiator molecule. Processes for preparing such polyethers are described both in the Polyurethane Handbook and Polyurethanes: Chemistry and Technology as well as in many patents, for example, U.S. Pat. Nos. 1,922,451; 2,674,619; 1,922,459; 3,190,927; and 3,346,557.

Polyester polyols also represent polyurethane-forming reactants. Such polyesters are well known in the art and are prepared simply by polymerizing polycarboxylic acids or their derivatives, for example, their acid chlorides or anhydrides, with a polyol. Numerous polycarboxylic acids are suitable, for example, malonic acid, citric acid, succinic acid, glutamic acid, adipic acid, pimelic acid, azelaic acid, sebacic acid, maleic acid, fumaric acid, terephthalic acid, phthalic acid. Numerous polyols are suitable, for example, the various aliphatic glycols, trimethylolpropane and trimethylolethane, α-methylglucoside, and sorbitol. Also suitable are low molecular weight polyoxyalkylene glycols such as polyoxyethylene glycol, polyoxypropylene glycol, and block and heteric polyoxyethylene-polyoxypropylene glycols. These lists of dicarboxylic acids and polyols are illustrative only and not limiting. An excess of polyol should be used to ensure hydroxyl termination although carboxy groups are also reactive with isocyanates. Methods of preparation of such polyester polyols are given in the *Polyurethane Handbook* and *Polyurethanes: Chemistry and Technology*.

Also suitable as the polyol are polymer modified polyols, in particular, the so-called graft polyols. Graft polyols are well known to the art and are prepared by the in situ polymerization of one or more vinyl monomers, preferably acrylonitrile and styrene, in the presence of a polyether or polyester polyol, particularly polyols containing a minor amount of natural or induced unsaturation. Methods of preparing such graft polyols may be found in columns 1–5 and in the Examples of U.S. Pat. No. 3,652,639; in columns 1–6 and the Examples of U.S. Pat. No. 3,823,201; particularly in columns 2–8 and the Examples of U.S. Pat. No. 4,690,956; and in the U.S. Pat. No. 4,524,157; all of which patents are herein incorporated by reference.

Non-graft polymer modified polyols are also preferred, for example, those prepared by the reaction of a polyisocyanate with an alkanolamine in the presence of a polyol as taught by U.S. Pat. Nos. 4,293,470; 4,296,213; and 4,374,209; dispersions of polyisocyanurates containing pendant urea groups as taught by U.S. Pat. No. 4,386,167; and polyisocyanurate dispersions also containing bioret linkages as taught by U.S. Pat. No. 4,359,541. Other polymer modified polyols may be prepared by the in situ size reduction of polymers until the particle size is less than 20 μm, preferably less than 10 μm.

Also useful in preparing polyurethanes are monomers containing other functional groups which are reactive with isocyanates. Examples of these are preferably the amines, for example, the substituted and unsubstituted toluenediamines and methylenedianilines; the alkanol amines; the amino-terminated polymers, to name but a few. The alkanolamines and amines, particularly diamines, are particularly useful as the amino group reacts faster than the hydroxyl group; thus, these molecules can act as isocyanate chain extenders in situ without the need to prepare prepolymers. Examples of hindered alkyl-substituted aromatic diamines that are particularly useful are disclosed in U.S. Pat. No. 4,218,543.

The principal blowing agents used in the present invention are water or mixtures of water and a formic acid. Both operate as chemical blowing agents, i.e., they react chemically with the isocyanate present to form a gas which, in turn, acts to foam the polyurethane system. Water is the preferred blowing agent of the present invention. When used in conjunction with the auxiliary agent it need not exceed 6 weight percent per 100 g of polyol to achieve densities of less than 2.0 pcf with no scorch. Formic acid, when used, reduces foam density as compared to all water blown systems. The use of the formic acid also significantly shortens cream times of foams. However, the use of formic acid results in forms exhibiting scorch.

The auxiliary agents used to modify the reactivity of a polyurethane system and as additional blowing agent are salts of formic acid, preferably ammonium formate (AF), sodium formate (SF), and potassium formate (PF). The salts are preferably used as solutions in water. Ammonium formate was effective in reducing foam density, and cream times when compared to a water blown foam. No scorching was noted. Sodium formate addition resulted in a lower density scorched foam. The foams had intermediate cream times (15 to 20 seconds) while tack-free times were lower than rise times. Potassium formate gave reductions in foam density, but gel and tack-free times were short (25 to 30 seconds) with rise times being longer than tack-free time by 15 seconds in the formulation used. Blends of ammonium formate with either sodium or potassium formates where AF was greater than 50 mole percent yielded unscorched foams. Cream, gel, rise, and tack-free times for salt mixtures tend to be intermediate to using each salt alone. The amount of auxiliary agent necessary to achieve desired modifications in reactivity characteristics is formulation dependent.

The urethane forming reaction is generally catalyzed. Catalysts useful are well known to those skilled in the art, and many examples may be found, for example, in the *Polyurethane Handbook*, Chapter 3, §3.4.1 on pages 90–95; and in *Polyurethanes: Chemistry and Technology*, Chapter IV, pages 129–217. Most commonly utilized catalysts are tertiary amines and organotin compounds, particularly dibutyltin diacetate and dibutyltin dilaurate. Combinations of catalysts are often useful also.

A surface active agent is generally necessary for production of polyurethane foams. Surfactants which may be used are those which aid in homogenizing the initial materials and may also be suitable for regulating cell structure. Typical examples are foam stabilizers such as siloxane oxyalkylene heterol polymers and other organic polysiloxanes, oxyethylated alkyl phenol, oxyethylated fatty alcohols, paraffin oils, castor oil ester, phthalic acid esters, ricindolic acid ester, and Turkey red oil, as well as cell regulators such as paraffins.

Chain extenders and/or crosslinkers may also be useful in the preparation of polyurethanes. Chain extenders are generally considered to be low molecular weight polyfunctional compounds or oligomers reactive with the isocyanate group. Aliphatic glycol chain extenders commonly used include ethylene glycol, propylene glycol, 1,4-butanediol, and 1,6-hexanediol. Amine chain extenders include aliphatic monoamines but especially diamines such as ethylenediamine and in particular the aromatic diamines such as the toluenediamines and the alkyl substituted (hindered) toluenediamines.

Other additives and auxiliaries are commonly used in polyurethanes. These additives include plasticizers, flow control agents, fillers, antioxidants, flame retardants, pigments, dyes, mold release agents, and the like. Many such additive and auxiliary materials are discussed in the *Polyurethane Handbook* in Chapter 3, §3.4, pages 90–109; and in *Polyurethanes: Chemistry and Technology*, Part 11, Technology.

Additives which may be used in the process of the present invention include known pigments, such as carbon black, dyes, and flame retarding agents (e.g., tris-chloroethyl phosphates or ammonium phosphate and polyphosphate), stabilizers against aging and weathering, plasticizers, such as gamma butyrolactone; fungistatic and bacteriostatic substances, and fillers.

The invention is further illustrated but is not intended to be limited by the following examples. All amounts are parts by weight unless otherwise indicated.

Polyol A is a toluenediamine-dipropylene glycol mixed initiator polyoxyethylenepolyoxypropylene block copolymer having a hydroxyl number of about 450 and a molecular weight of about 451.

Polyol B is a glycerine initiated polyoxypropylene copolymer having a hydroxyl number of about 400 and a molecular weight of about 420.

DC-193 is a silicone surfactant available from Dow Corning.

POLYCAT8 is a tertiary amine catalyst available from Air Products.

AF is a 2:1.5, ammonium formate: water solution.

SF is a 1:1, sodium formate: water solution.

PF is a 2:1, potassium formate: water solution.

FA is 96 percent formic acid aqueous solution.

ISO A is a solvent-free polymethylene polyphenylisocyanate having a functionality of about 2.7 and an isocyanate content of 31.4 weight percent.

SAMPLE PREPARATION

The following procedure was used to prepare all samples. Resins were prepared by weighing all components to with ±0.1 grams. Each resin was either mixed individually using a Jiffy mixer on a drill press stand or master batches were prepared if a series were prepared with common components.

Generally, the resin was weighed into a quart coated cup and any missing component added individually. The mixture was agitated for seven to ten seconds using a German mixing blade. The preweighed amount of Iso A was added and the resulting mixture agitated for five to seven seconds. It was then poured into one-gallon, No. 10 Lily cups, Cream, gel, rise, and tack-free times were measured.

The normal amounts of materials used were based upon 100 grams of the polyol blend plus appropriate additional components. Cup densities were measured by removing any foam above the lip of the cup and multiplying the net weight of the foam by the factor 0.0113.

Block samples were removed by cutting 4"×4"×8" blocks from the center of the cup at least one day later. There were often holes in the bottom of the foam, and the size of the block permitted their removal.

TABLE 1

| DESIGNATIONS | 1 | 2 | 3 | 4 | 5 | 6 | 7 | 8 |
|---|---|---|---|---|---|---|---|---|
| POLYOL A | 60 | 60 | 60 | 60 | 60 | 60 | 60 | 60 |
| POLYOL B | 40 | 40 | 40 | 40 | 40 | 40 | 40 | 40 |
| DC-193 | 1.5 | 1.5 | 1.5 | 1.5 | 1.5 | 1.5 | 1.5 | 1.5 |
| POLYCAT 8 | 1.0 | 0.5 | 0.1 | 0.7 | 0.7 | 0.15 | 0.15 | 0.35 |
| AF | — | 11.15 | 11.15 | — | — | — | — | — |
| SF | — | — | — | 11.7 | 11.7 | — | — | — |
| PF | — | — | — | — | — | 13.9 | 13.9 | 13.9 |
| FA | — | — | — | — | — | — | — | — |
| WATER | 6.6 | — | — | — | — | — | — | — |
| TOTAL WATER | — | 4.78 | 4.78 | 5.85 | 5.85 | 4.63 | 4.63 | 4.63 |
| ISO A | 219 | 219 | 219 | 232 | 222 | 219 | 210 | 220 |
| INDEX | 110 | 100 | 100 | 110 | 105 | 110 | 105 | 110 |
| MIX TIME (sec.) | 7 | 5 | 5 | 7 | 7 | 7 | 7 | 7 |
| CREAM TIME (sec.) | 15 | 6 | 7 | 15 | 15 | 13 | 11 | 13 |
| GEL TIME (sec.) | 55 | 43 | 51 | 56 | 45 | 32* | 30* | 29* |
| RISE TIME (sec.) | 114 | 95 | 120 | 86 | 87 | — | 64 | 68 |
| TACK-FREE TIME (sec.) | 210 | 117 | 130 | 66 | 55 | — | 35 | 35 |
| SCORCH (?) | X | X | X | I | I | I | I | I |
| DENSITY, pcf, CUP | 1.62 | 1.57 | 1.63 | 1.61 | 1.58 | 2.19 | 2.11 | 2.16 |
| DENSITY, pcf, BLOCK (4" × 4" × 6") | 1.47 | 1.30 | 1.35 | 1.37 | 1.33 | 1.68 | 1.65 | 1.63 |
| SHRINKAGE, PERCENT, BLOCK 6 DAY | 2 | <10 | <10 | 5 | 3 | 0 | 3 | 0 |
| DENSITY, pcf, TEST SAMPLE | 1.29 | 1.30 | 1.41 | 1.27 | 1.40 | 1.47 | 1.41 | 1.59 |
| POROSITY, PERCENT, CLOSED CELL | 88 | 83 | 80 | 96 | 91 | 22 | 16 | 45 |

| DESIGNATIONS | 9 | 10 | 11 | 12 | 13 | 14 | 15 | 16 |
|---|---|---|---|---|---|---|---|---|
| POLYOL A | 60 | 60 | 60 | 60 | 60 | 60 | 60 | 60 |
| POLYOL B | 40 | 40 | 40 | 40 | 40 | 40 | 40 | 40 |
| DC-193 | 1.5 | 1.5 | 1.5 | 1.5 | 1.5 | 1.5 | 1.5 | 1.5 |
| POLYCAT 8 | 0.3 | 0.3 | 0.3 | 0.3 | 0.1 | 0.1 | 0.7 | 0.15 |
| AF | 8.36 | 5.58 | 2.79 | 5.58 | — | — | — | — |
| SF | 2.93 | 5.85 | 8.78 | 5.20 | 7.8 | 5.3 | 11.7 | — |
| PF | — | — | — | — | — | — | — | 13.9 |
| FA | — | — | — | — | 4.0 | 4.0 | — | — |
| WATER | — | — | — | — | — | — | — | — |
| TOTAL WATER | 5.05 | 5.32 | 5.59 | 4.99 | 4.06 | 2.81 | 5.85 | 4.63 |
| ISO A | 223 | 226 | 229 | 206 | 219 | 193 | 207 | 188 |
| INDEX | 102.4 | 104.8 | 107.4 | 98.4 | 10 | 10 | 98.1 | 93.9 |
| MIX TIME (sec.) | 7 | 5 | 5 | 5 | 5 | 5 | 7 | 7 |
| CREAM TIME (sec.) | 7.9 | 9.3 | 12 | 8.3 | 5.6 | 4.8 | 15 | 12 |
| GEL TIME (sec.) | 40 | 41.5 | 55 | 37 | 36 | 29 | 46 | 28 |
| RISE TIME (sec.) | 96 | 97 | 94 | 75 | 68 | 56 | 92 | 68 |
| TACK-FREE TIME (sec.) | 68 | 55 | 65 | 57 | 46 | 38 | 55 | 34 |
| SCORCH (?) | X | X | X | X | I | I | I | X |
| DENSITY, pcf, CUP | 1.49 | 1.49 | 1.61 | 1.49 | 1.47 | 1.63 | 1.53 | 1.98 |

TABLE 1-continued

| | | | | | | | | |
|---|---|---|---|---|---|---|---|---|
| DENSITY, pcf, BLOCK (4" × 4" × 6") | 1.29 | 1.32 | 1.40 | 1.30 | 1.18 | 1.31 | 1.25 | 1.54 |
| SHRINKAGE, PERCENT, BLOCK 6 DAY | 2.5 | 2.5 | 2.5 | 2.5 | X | 2 | >10 | X |
| DENSITY, pcf, TEST SAMPLE | 1.13 | 1.28 | 1.21 | 1.28 | 1.08 | 1.21 | 1.08 | 1.47 |
| POROSITY, PERCENT, CLOSED CELL | 91 | 90 | 96 | 79 | 63 | 91 | 3.6 | |

I = SCORCH;
X = NO SCORCH;
*BOTTOM OF CUP PUSHED OUT

TABLE 2

| DESIGNATION | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| POLYOL A | 60 | 60 | 60 | 60 | 60 | 60 | 60 | 60 | 60 | 60 | 60 | 60 | 60 | 60 |
| POLYOL B | 40 | 40 | 40 | 40 | 40 | 40 | 40 | 40 | 40 | 40 | 40 | 40 | 40 | 40 |
| DC-193 | 1.5 | 1.5 | 1.5 | 1.5 | 1.5 | 1.5 | 1.5 | 1.5 | 1.5 | 1.5 | 1.5 | 1.5 | 1.5 | 1.5 |
| WATER | 6.6 | 6.6 | — | — | — | — | — | — | — | — | — | — | — | — |
| POLYCAT 8 | 1.0 | 0.6 | 0.6 | 0.6 | 0.6 | 0.6 | 0.6 | 0.6 | 0.6 | 0.6 | 0.6 | 0.6 | 0.6 | 0.6 |
| AF | — | — | 9.24 | 9.24 | 9.24 | 9.24 | — | 3.08 | 3.08 | 3.08 | — | 3.08 | 4.62 | 6.16 |
| SF | — | — | — | — | — | — | 10.4 | 6.93 | 6.93 | 6.93 | — | — | — | — |
| PF | — | — | — | — | — | — | — | — | — | — | 13.9 | 9.27 | 6.95 | 4.63 |
| TOTAL WATER | 6.6 | 6.6 | 3.96 | 3.96 | 3.96 | 3.96 | 5.2 | 4.79 | 4.79 | 4.79 | 4.63 | 4.41 | 4.29 | 4.18 |
| ISO A | 219 | 219 | 219 | 209 | 239 | 259 | 219 | 219 | 209 | 239 | 220 | 220 | 220 | 220 |
| INDEX | 110 | 110 | 110 | 105 | 120 | 130 | 110 | 110 | 105 | 120 | 110 | 110 | 110 | 110 |
| MIX TIME (sec.) | 7 | 7 | 5 | 5 | 5 | 5 | 5 | 5 | 5 | 5 | 5 | 5 | 5 | 5 |
| CREAM TIME (sec.) | 16.3 | 24.6 | 6 | 5.5 | 9 | 8 | 16.5 | 13.4 | 15.7 | 14.8 | 12.5 | 9.5 | 9 | 7.4 |
| GEL TIME (sec.) | 54 | 79 | 50 | 47 | 52 | 55 | 46 | 50 | 40 | 46 | 27 | 25 | 31 | 29 |
| RISE TIME (sec.) | 77 | 90 | 71 | 76 | 86 | 93 | 97 | 71 | 71 | 74 | 31 | 30 | 41 | 34 |
| TACK-FREE TIME (sec.) | 180 | ?180 | 102 | 94 | 92 | 103 | 55 | 60 | 51 | 60 | 39 | 28 | 34 | 46 |
| SCORCH (?) | X | X | X | X | X | X | I | I | I | I | I | I | X | X |
| DENSITY, pcf, CUP | 1.66 | 1.79 | 1.78 | 1.75 | 1.88 | 2.00 | 1.75 | 1.69 | 1.64 | 1.79 | 2.16 | 1.89 | 1.79 | 1.68 |
| DENSITY, pcf, BLOCK | 1.57 | 1.66 | 1.63 | 1.59 | 1.71 | 1.85 | 1.54 | 1.59 | 1.54 | 1.70 | 1.71 | 1.59 | 1.56 | 1.51 |
| DENSITY, pcf, TEST SAMPLE | 1.63 | 1.74 | 1.43 | 1.64 | 1.84 | 1.59 | 1.51 | 1.65 | 1.35 | 1.75 | 1.83 | 1.66 | 1.68 | 1.59 |
| POROSITY, PERCENT, CLOSED CELL | 105 | 94 | 101 | 102 | 102 | 107 | 94 | 108 | 108 | 104 | 84 | 92 | 85 | 80 |

I = SCORCH;
X = NO SCORCH

TABLE 3

| DESIGNATION | 1 | 2 | 3 | 4 | 5 | 6 | 7 | 8 | 9 | 10 |
|---|---|---|---|---|---|---|---|---|---|---|
| POLYOL A | 60 | 60 | 60 | 60 | 60 | 60 | 60 | 60 | 60 | 60 |
| POLYOL B | 40 | 40 | 40 | 40 | 40 | 40 | 40 | 40 | 40 | 40 |
| DC-193 | 1.5 | 1.5 | 1.5 | 1.5 | 1.5 | 1.5 | 1.5 | 1.5 | 1.5 | 1.5 |
| WATER | 7.0 | 7.0 | 7.0 | 7.0 | 7.0 | 7.0 | 7.0 | 7.0 | 7.0 | 7.0 |
| POLYCAT 8 | 1.0 | 0.6 | 0.6 | 0.6 | 0.6 | 0.6 | 0.6 | 0.6 | 0.6 | 0.6 |
| AF | — | — | 4.62 | 5.08 | 5.78 | 6.47 | 4.62 | 5.08 | 5.78 | 4.16 |
| SF | — | — | — | — | — | — | 5.20 | 5.72 | 6.24 | 4.68 |
| PF | — | — | 6.95 | 7.65 | 8.34 | 9.73 | — | — | — | — |
| TOTAL WATER | 7.0 | 7.0 | 4.29 | 4.72 | 5.25 | 5.98 | 4.58 | 5.04 | 5.60 | 4.12 |
| ISO A | 226 | 226 | 240 | 251 | 266 | 286 | 239 | 251 | 266 | 228 |
| INDEX | 110 | 110 | 120 | 120 | 120 | 120 | 120 | 120 | 120 | 120 |

TABLE 3-continued

| DESIGNATION | 1 | 2 | 3 | 4 | 5 | 6 | 7 | 8 | 9 | 10 |
|---|---|---|---|---|---|---|---|---|---|---|
| MIX TIME, sec. | 7 | 7 | 7 | 7 | 7 | 7 | 7 | 7 | 7 | 7 |
| CREAM TIME, sec. | 17.3 | 21.2 | 10.9 | 12.4 | 11.8 | 13.9 | 15.2 | 15.1 | 15.5 | 15.8 |
| GEL TIME, sec. | 52.8 | 70.6 | 35.8 | 43.0 | 38.3 | 55.0 | 50.5 | 60.4 | 58.7 | 61.5 |
| RISE TIME, sec. | 81.5 | 113 | 58.7 | 66.3 | 66.0 | 87.4 | 140 | 106 | 98.6 | 98.2 |
| TACK-FREE TIME, sec. | 133 | 182 | 47.3 | 54.2 | 50.5 | 73.1 | 67.7 | 86.0 | 80.0 | 93.8 |
| DENSITY, CUP, pcf | 1.73 | 1.74 | 2.02 | 1.95 | 1.71 | 1.78 | 1.80 | 1.76 | 1.65 | 2.06 |
| DENSITY, BLOCK, pcf | 1.52 | 1.49 | 1.67 | 1.61 | 1.47 | 1.41 | 1.61 | 1.50 | 1.45 | 1.47 |
| 4" × 4" × 6" DENSITY, TEST SAMPLE | 1.52 | 1.36 | 1.60 | 1.57 | 1.41 | 1.39 | 1.69 | 1.45 | 1.38 | 1.84 |
| POROSITY, PERCENT CLOSED CELLS | 106 | 100 | 100 | 101 | 96.5 | 89.4 | 104 | 101 | 105 | 108 |

FORMATE SALTS

Solutions of ammonium, potassium and sodium salts in water were used to prepare rigid foams. Several are described in Table 1. Ammonium formate (AF) led to fast cream times and faster gel, rise, and tack-free times than for all-water blown foams. Foam densities at 4.78 parts of free water were the same as those obtained with 6.6 parts of water in the all-water foam (Examples 2 and 3 vs. 1).

The use of sodium and potassium formates (SF and PF) yielded cream times close to that of the water-blown foam. With PF, gel and rise times were cut in half, and tack-free times were close to gel times and about half the rise times. This resulted in bulging of the foam to the point where the bottom of the cups burst (Examples 6 and 7). The SF foams had longer gel, rise, and tack-free times, but tack-free times were still lower than rise times (Examples 4 and 5). Using both PF and SF as auxiliary agents, scorching resulted. Especially noteworthy was the low closed cell content of the PF foams (22 percent and 16 percent), Examples 6 and 7.

Ammonium Formate (AF)

Further experiments with AF foams are given in Table 2 (Examples 3 through 6) where the index was changed from 105 to 130. As the index rose, reaction times increased so that cream times (8±seconds) were obtained. Foam density decreased.

Sodium Formate (SF)

Experiments with sodium formate solutions are shown in Table 2, Example 7; and Table 3, Examples 3 through 7. The Examples in Table 3 were run at a constant index of 120, but the amount of SF solution was changed from 11.7 to 7.02 parts. Thus, the free water content changed from 5.86 to 3.51 parts. This was done to obtain foams with increasing densities. Reaction times increased with increasing "free" water level, but tack-free time was always less than rise time. In all instances, however, scorching occurred.

Potassium Formate (PF)

Experiments with PF resulted in foams having a fast tack-free time (less than rise time) accompanied by bulging and even pushing out of the bottom of the cup (Table 1, Examples 6 through 8). In all cases, scorching occurred.

Mixtures of AF/SF

The experiments using combinations are described in Table 1, Examples 9–12; Table 2, Examples 8–10; and Table 3, Examples 8–12. In Table 1, blends (molar) of AF and SF were used in the ratios of 1:0; 0.75/0.25;0.5/0.5;0.25/0.75; and 0/1. Cream times rose slowly with increasing SF while gel time rose rapidly when a ratio over 1:1 was used. Density was minimized at 0.25–0.5 parts of AF.

Index

The effect of changing index while keeping the AF:SF molar ratio at 1:3 is described in Table 2, Examples 8 through 10. As index increased from 105 to 120, density increased.

Mixtures of AF/PF

As noted earlier, the use of ammonium formate (AF) solutions alone gave very fast cream times. The use of potassium formate (PF) solutions alone gave longer cream times but very rapid tack-free and gel times and scorched foams. The foam cups bulged and paper-foam adhesion appeared excellent. This probably was due to the fact that the foams continued to rise after gelling and over-packed the cups. Combinations of the AF and PF solutions were tried to see if behavior of each could be modified. The experiment was to vary the molar ratio of the two salts and is described in Table 2, Examples 12 and 14. Cream times rose with increasing PF. Gel times increased while rise and tack-free times had minimum values and crossed at about a 50:50 ratio. That is, tack-free times were lower than rise times at 20 percent to 60 percent PF.

We claim:

1. A method of modifying reactivity characteristics, such as cream time, gel time, rise time, and tack-free time, of a low density, rigid polyurethane foam by;
   A) adding an auxiliary agent selected from the group consisting of ammonium formate, sodium formate, potassium formate and mixture, to a rigid polyurethane foam, comprising;
   B) a polyisocyanate component;
   C) an isocyanate reactive component containing at least one organic compound having at least two isocyanate reactive groups; selected from the group consisting of
      i) polyoxyalkylene polyether polyols
      ii) polyester polyols
      iii) polymer modified polyoxyalkylene polyol, and
      iv) mixtures thereof
   D) water as a blowing agent;
   E) a catalyst capable of promoting urethane formation, and
   F) a surfactant.

2. A method as claimed in claim 1, wherein the auxiliary agent is added as an aqueous solution.

3. A method as claimed in claim 1, wherein the auxiliary agent is an aqueous solution of ammonium formate.

4. A method as claimed in claim 1, wherein the auxiliary agent is an aqueous mixture of ammonium formate and sodium formate in a 1:1 molar ratio.

5. A method as claimed in claim 1, wherein the auxiliary agent is an aqueous mixture of ammonium formate and potassium formate.

6. A method as claimed in claim 1, wherein the isocyanate component in a polymethylene polyphenylisocyanate.

7. A method as claimed in claim 1, wherein the isocyanate reactive component is selected from the group consisting of hydroxyl terminated polyoxyalkylene polyether polyols having functionalities from 2 to 8.

* * * * *